US008207960B2

(12) United States Patent
Chiu et al.

(10) Patent No.: US 8,207,960 B2
(45) Date of Patent: *Jun. 26, 2012

(54) SOURCE DRIVER WITH LOW POWER CONSUMPTION AND DRIVING METHOD THEREOF

(75) Inventors: Ming-Cheng Chiu, Tainan County (TW); Cheng-Lung Chiang, Tainan County (TW); Way-Guo Tseng, Tainan County (TW)

(73) Assignee: Himax Technologies Limited, Tainan (TW)

(*) Notice: Subject to any disclaimer, the term of this patent is extended or adjusted under 35 U.S.C. 154(b) by 667 days.

This patent is subject to a terminal disclaimer.

(21) Appl. No.: 12/394,535

(22) Filed: Feb. 27, 2009

(65) Prior Publication Data

US 2010/0220095 A1 Sep. 2, 2010

(51) Int. Cl.
*G06F 3/038* (2006.01)

(52) U.S. Cl. ........................................ 345/214; 345/100

(58) Field of Classification Search ........................ None
See application file for complete search history.

(56) References Cited

U.S. PATENT DOCUMENTS

| | | | | |
|---|---|---|---|---|
| 7,573,470 | B2 * | 8/2009 | Hong | 345/204 |
| 2002/0084840 | A1 * | 7/2002 | Tsuchi | 327/563 |
| 2008/0143697 | A1 * | 6/2008 | Kojima | 345/204 |

* cited by examiner

*Primary Examiner* — Jason Olson
(74) *Attorney, Agent, or Firm* — J.C. Patents

(57) ABSTRACT

A source driver adapted to drive a display panel and a driving method thereof are provided herein. The source driver includes an output buffer and a first pre-charge circuit. The output buffer has a first input terminal receiving a pixel signal and has both of a second input terminal and an output terminal coupled to the display panel. The first pre-charge circuit charges the output terminal of the output buffer to a preset voltage associated with the pixel signal for a pre-charge period. The output buffer is inactivated during the pre-charge period and is activated for a preset period after the pre-charge period. Therefore, power consumption of the source driver can be reduced.

7 Claims, 3 Drawing Sheets

SOURCE DRIVER WITH LOW POWER CONSUMPTION AND DRIVING METHOD THEREOF

BACKGROUND OF THE INVENTION

1. Field of Invention

The present invention relates to a source driver and a driving method thereof, and more particularly, to a source driver that includes an output buffer charging a display panel in a phased manner for reducing power consumption.

2. Description of the Related Art

FIG. 1 is a block diagram of a conventional source driver 110 and a display panel 140. Referring to FIG. 1, the source driver 110 includes a plurality of driving channels 120. Each of the driving channels 120 includes a latch 122, a digital-to-analog converter (DAC) 124, an output buffer 126, and an output switch 128. Video data on the data bus is sequentially input into the driving channels 120 in response to a control signal CON provided by a timing controller (not shown). The source driver 110 converts the digital video data into analog driving signal through the DAC 124, and transmits the driving signal to the output buffer 126. The output buffer 126 further enhances the driving signal and passes the driving signals to the display panel 140 through the conducted output switch 128 for driving pixels on the display panel 140.

Generally, in the driving system of the LCD, a polarity of the driving signal delivered to a certain pixel must be periodically converted for avoiding a residual image phenomenon caused by liquid crystal polarization. There are three types of polarity inversion for driving the display panel, i.e. frame inversion, column inversion, and dot inversion. Taking the dot inversion as an example, the adjacent pixels in one frame are driven by the driving signals with opposite polarities, and the pixels in the same location of two continuous frames are also driven by the driving voltages with opposite polarities. Since the driving signal with opposite polarities have different voltage levels, the voltage swing of the output buffer 126 causes large power consumption so the output buffer 126 contributes a large percentage of power consumption to the source driver 120. Therefore, how to solve this problem becomes an important issue to be researched and discussed.

SUMMARY OF THE INVENTION

Accordingly, the present invention provides a source driver and a driving method thereof can reduce power consumption.

A source driver adapted to drive a display panel is provided in the present invention. The source driver includes an output buffer and a first pre-charge circuit. The output buffer has a first input terminal receiving a pixel signal, and has a second input terminal coupled to an output terminal thereof, wherein the output terminal of the output buffer is coupled to the display panel. The first pre-charge circuit charges the output terminal of the output buffer to a preset voltage associated with the pixel signal for a pre-charge period. The output buffer is inactivated during the pre-charge period and the output buffer is activated for a preset period after the pre-charge period.

In an embodiment of the present invention, the foregoing source driver further includes an operational amplifier. The operational amplifier provides the pixel signal to the first input terminal of the output buffer. The output buffer is inactivated for a transmission period after the preset period. The pixel signal provided by the operational amplifier is delivered to the output terminal of the output buffer during the transmission period.

A driving method adapted to a source driver to drive a display panel is provided herein. The source driver include an output buffer having a first input terminal receiving a pixel signal, and having both of a second input terminal and an output terminal coupled to the display panel. In the driving method, the output terminal of the output buffer is pre-charged to a preset voltage associated with the pixel signal for a pre-charge period, wherein the output buffer is inactivated during the pre-charge period. Next, the output buffer is activated for a preset period after the pre-charge period.

In an embodiment of the foregoing driving method, the output buffer is inactivated for a transmission period after the preset period, and in the meanwhile, the pixel signal is delivered to the output terminal of the output buffer during the transmission period.

The present invention dynamically charges the output terminal of the output buffer to the preset voltage associated with the pixel signal, so that the output buffer is assisted in charging the output terminal of the output buffer to a voltage level of the pixel signal in a phased manner. During the pre-charge period and/or the transmission period, the output buffer is inactivated so as to reduce an amount of activated time of the output buffer and reduce power consumption of the source driver as a consequence.

In order to make the features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
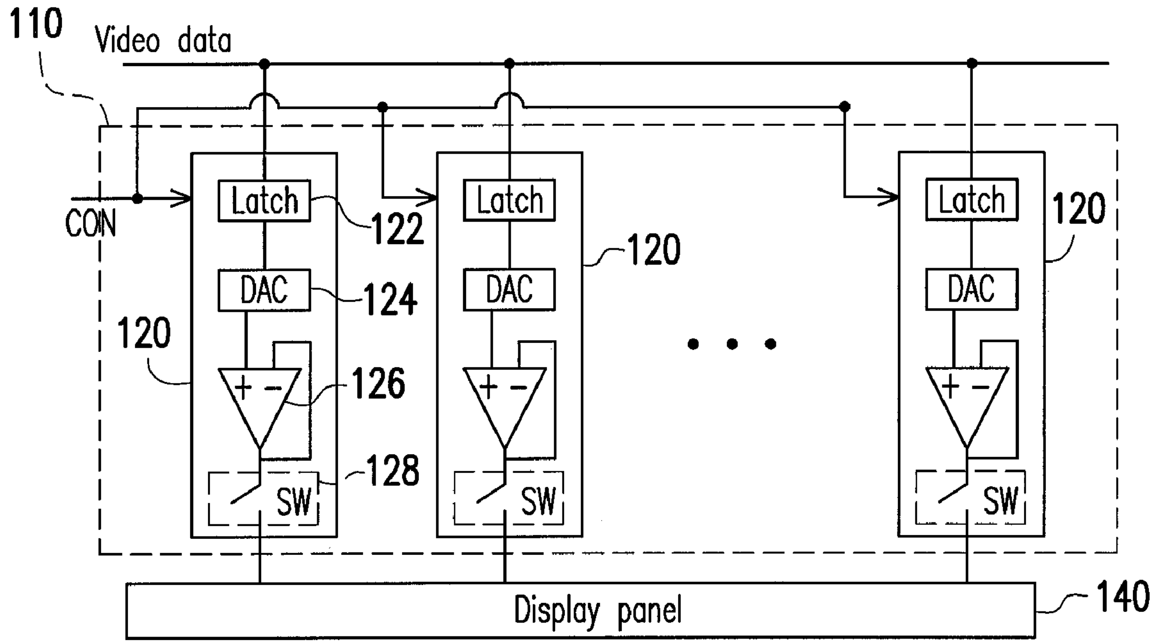
FIG. 1 (PRIOR ART)
FIG. 1 is a block diagram of a conventional source driver 110 and a display panel 140.

Reference will now be made in detail to the present embodiments of the invention, examples of which are illustrated in the accompanying drawings. Wherever possible, the same reference numbers are used in the drawings and the description to refer to the same or like parts.

Figure 2:
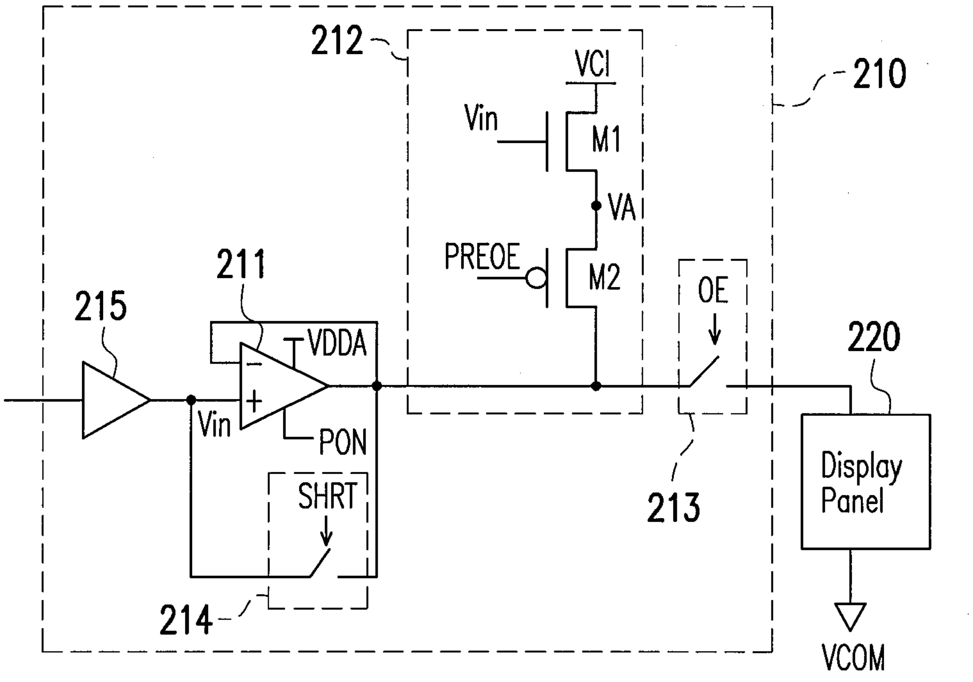
FIG. 2 is a circuit diagram of a source driver according to an embodiment of the present invention.

FIG. 2 is a circuit diagram of a source driver according to an embodiment of the present invention. Referring to FIG. 2, the source driver 210 is adapted to drive a display panel 220, for example, a liquid display panel or a liquid crystal on silicon (LCoS) panel. Generally, the display panel 220 includes a plurality of pixel circuits (not shown) disposed on, and liquid crystal corresponding to location of each pixel circuit is oriented according to a voltage offset between a pixel electrode and a common electrode for controlling light transmission of liquid crystal, wherein a voltage of the pixel electrode is changed as a pixel signal and a voltage of the common electrode may be a direct-current (DC) voltage or an alternating-current (AC) voltage. For the convenience of description, a first terminal and a second terminal of the display panel 220 can be seen as the pixel electrode and the common electrode, respectively.

The source driver 210 includes an output buffer 211 and a pre-charge circuit 212, and switching units 213 and 214, wherein the switching units 213-214 can be respectively implemented by switches, transistors or other semiconductor elements, and the conductive states of the switching units 213-214 are respectively determined by two control signals OE and SHRT. In addition, people ordinarily skilled in the art know that the source driver further includes other elements not shown in FIG. 2, e.g. shift register, digital-to-analog converter, and etc., so the details related to those elements is not described herein. The output buffer 211, for example, is implemented by an operational amplifier, which has a first input terminal (e.g. non-inverted terminal) receiving a pixel signal Vin provided by an operational amplifier 215, and has a second input terminal (e.g. inverted terminal) and an output terminal coupled together, wherein the output terminal of the output buffer 211 is coupled to the display panel 220 via the switching unit 213. The operational amplifier 215 is shown to represent an anterior stage of the output buffer 211 to provide the pixel signal Vin.

The output buffer 211 enhance a driving ability of the pixel signal Vin to avoid signal attenuation during transmission, and delivers the enhanced pixel signal to the display panel 220 when the switching unit 213 is conducted. The output buffer 211 is determined to be activated or inactivated according to a control signal PON, such as a power supple signal. The switching unit 214 coupled between the first input terminal and the output terminal of the output buffer 211 can directly deliver the pixel signal provided by the operational amplifier 215 to the output terminal of the output buffer 211 when the switching unit 214 is conducted.

The pre-charge circuit 212 includes switches M1 and M2 respectively implemented by an N-type transistor and a P-type transistor. A first terminal and a second terminal of the switch M1 is respectively coupled to a first voltage VCI and the switch M2, wherein the first voltage VCI is a direct-current voltage smaller than a positive power voltage VDDA of the output buffer 211. The conductive state of the switch M1 is determined by the pixel signal Vin for providing a preset voltage VA associated with the pixel signal Vin. The conductive state of the switch M2 is determined by a control signal PREOE for delivering the preset voltage VA to the first terminal of the display panel 220. The pre-charge circuit 212 is utilized to pre-charge the first terminal of the display panel 220 to the preset voltage VA for assisting the output buffer 211 in charging the display panel 220 to the voltage level of the pixel signal Vin in the phase manner. The following describes the operation of the source driver 210 in detail.

Figure 3:
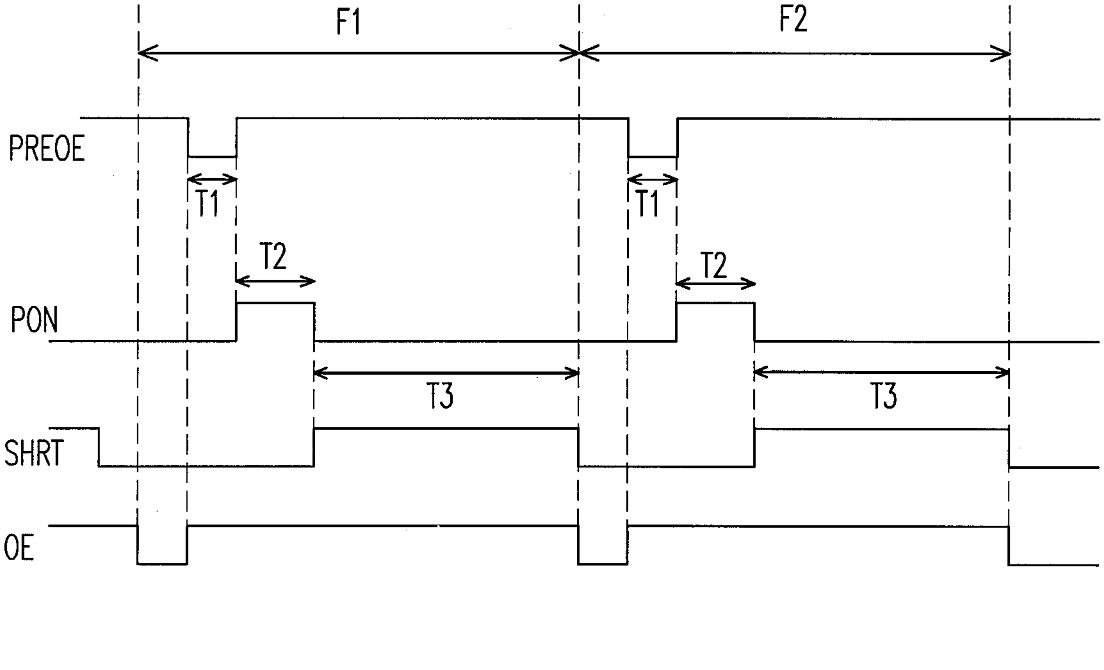
FIG. 3 is a timing diagram of the source driver according to the embodiment in FIG. 2.

FIG. 3 is a timing diagram of the source driver according to the embodiment in FIG. 2. Referring to FIG. 2 and FIG. 3, the source driver 200 drives the display panel 220 with positive polarity during a frame period F1 and drives the display panel 220 with negative polarity during a frame period F2. Taking the pre-charge operation of the source driver 200 during the frame period F1 as an example, the pre-charge circuit 211 pre-charges the first terminal of the display panel 220 to the preset voltage VA associated with the pixel signal Vin via the conducted switch M2 controlled by the control signal PREOR for a pre-charge period T1 before the output buffer 211 is activated by the control signal PON. In the meanwhile, the switching unit 213 is simultaneously conducted by the asserted control signal OE for delivering the preset voltage VA to the display panel 220. During the pre-charge period T1, the output buffer 211 controlled by the control signal PON is inactivated for reducing power consumption.

Referring to FIG. 2, when the pixel signal Vin is less than a sum of the first voltage VCI and a threshold voltage Vth of the switch M1, the first terminal of the display panel 220 may be pre-charged to the preset voltage VA=(Vin−Vth) by the pre-charge circuit 212. In addition, when the pixel signal Vin is larger than the sum of the first voltage VCI and the threshold voltage Vth of the switch M1, the first terminal of the display panel 220 may be pre-charged to the preset voltage VA substantially equal to the first voltage VCI. Therefore, the pre-charge circuit 212 dynamically pre-charges the first terminal of the display panel 220 to the preset voltage VA associated with the pixel signal Vin.

After the pre-charge period T1, the output buffer 211 is activated by the asserted control signal PON for a preset period T2, so that the output buffer 211 can enhance the pixel signal Vin and deliver the enhanced signal Vin to the display panel 220 via the conducted switching unit 213, wherein the switching unit 213 controlled by the control signal OE is still conducted during the pre-charge period T1. Since the voltage at the output terminal of the output buffer 211 follows the voltage of the pixel signal Vin, the output buffer 211 then charges the first terminal of the display panel 220 from the preset voltage VA to the voltage of the pixel signal Vin. During the pre-charge period T1, the output buffer 211 is inactivated for reducing power consumption.

After the preset period T2, which is sufficient for the output buffer 211 to charge the first terminal of the display panel 220 to the voltage of the pixel signal Vin, the output buffer 211 is then inactivated again for a transmission period T3. In the meanwhile, the switching unit 214 is conducted during the transmission period T3 to directly deliver the pixel signal Vin provided by the operational amplifier 215 to the output terminal of the output buffer 211 and to the display panel 220 via the conducted switching unit 213, wherein the switching unit 213 is still conducted during the transmission period T3. The pre-charge operation of the source driver 210 during the frame period F2 is similar to the pre-charge operation of the source driver 210 during the frame period F1.

Figure 4:
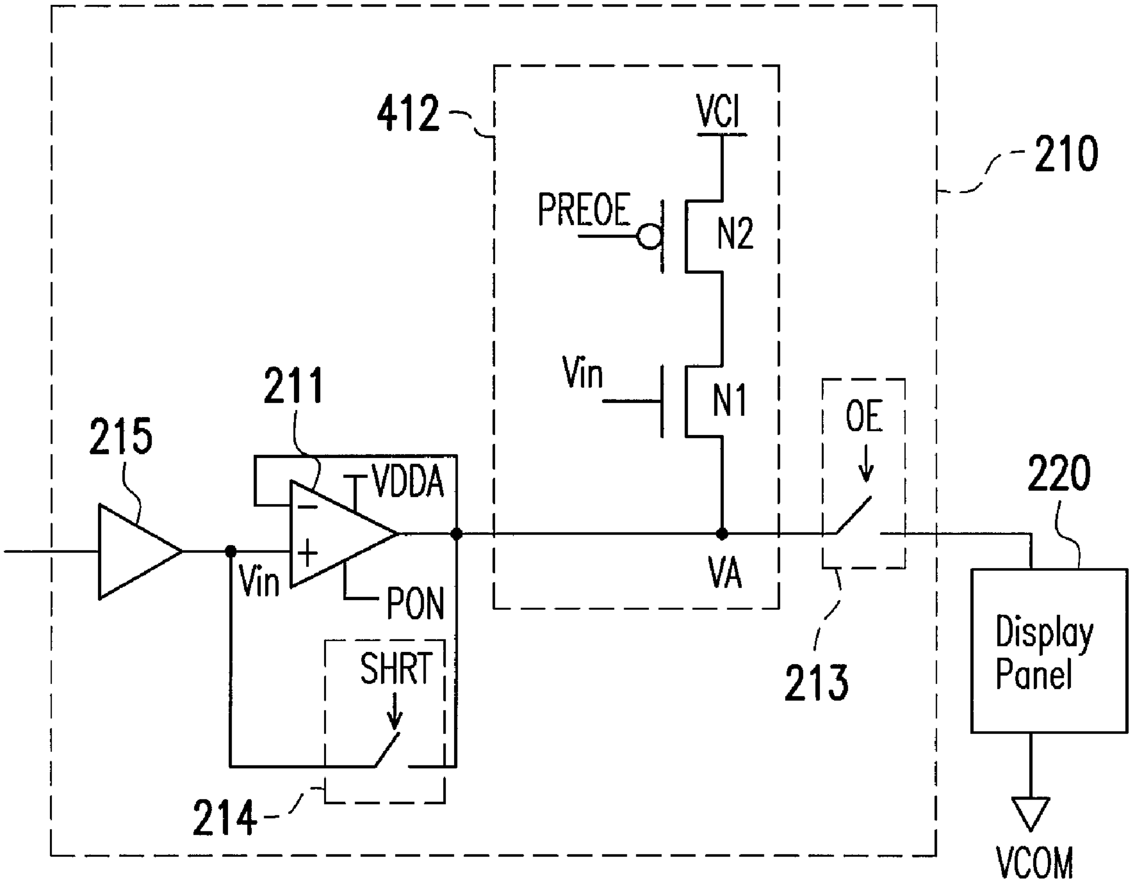
FIG. 4 is a circuit diagram of a source driver according to another embodiment of the present invention.

FIG. 4 is a circuit diagram of a source driver according to another embodiment of the present invention. Referring to FIG. 2 and FIG. 4, the difference between the embodiments in FIG. 2 and FIG. 4 is that the pre-charge circuit 412 includes switches N1 and N2 respectively implemented by an N-type transistor and a P-type transistor. A first terminal and a second terminal of the switch N2 is respectively coupled to the first voltage VCI and the switch N1, wherein the conductive state of the switch N2 is determined by the control signal PREOE for delivering the first voltage VCI to the switch N1. The conductive state of the switch N1 is determined by the pixel signal Vin for providing a preset voltage VA associated with the pixel signal Vin to the display panel 220. Similarly, referring the timing diagram shown in FIG. 3, the pre-charge circuit 412 is utilized to pre-charge the first terminal of the display panel 220 to the preset voltage VA for assisting the output buffer 211 in charging the display panel 220 to the voltage level of the pixel signal Vin in the phase manner.

In summary, the said embodiment utilizes the pre-charge circuit to provide the preset voltage associated with the pixel signal for assisting the output buffer 211 in charging the first terminal of the display panel to the voltage of the pixel signal Vin in the phased manner. The preset voltage provided by the pre-charge circuit 211 can be adaptively adjusted according to the pixel signal Vin. As a result, a voltage swing of the output buffer 211 can be reduced for saving power consumption when the output buffer 211 is activated. In addition, since the output buffer 211 is inactivated during the pre-charge period T1 and/or the transmission period T3, an amount of the activated time of the output buffer 211 is reduce, so does the power consumption of the source driver 210.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A source driver, adapted to drive a display panel, comprising:

an output buffer, having a first input terminal receiving a pixel signal, a second input terminal, and an output terminal coupled to the second input terminal and the display panel; and a first pre-charge circuit, which comprises a first transistor, having a gate receiving the pixel signal, a first source/drain coupled to the first voltage, and a second source/drain outputting the preset voltage; and a switch, having a first terminal coupled to the second source/drain of the first transistor, and a second terminal coupled to the output terminal of the output buffer, wherein the switch is conducted for the pre-charge period to deliver the preset voltage to the output terminal of the output buffer, charging the output terminal of the output buffer to a preset voltage associated with the pixel signal for a pre-charge period, wherein the output buffer is inactivated during the pre-charge period and the output buffer is activated for a preset period after the pre-charge period.

2. The source driver as claimed in claim 1, further comprising:

a first switching unit, conducting the output terminal of the output buffer to the display panel for delivering a signal of the output terminal of the output buffer to the display panel.

3. The source driver as claimed in claim 1, further comprising:

an operational amplifier, providing the pixel signal to the first input terminal of the output buffer, wherein the output buffer is inactivated for a transmission period after the preset period, and the pixel signal provided by the operational amplifier is delivered to the output terminal of the output buffer during the transmission period.

4. The source driver as claimed in claim 3, further comprising:

a second switching unit, conducting the first input terminal of the output buffer to the output terminal of the output buffer during the transmission period.

5. The source driver as claimed in claim 1, wherein the first voltage is a direct-current voltage smaller than a positive power voltage of the output buffer.

6. The source driver as claimed in claim 1, wherein the first voltage is between a voltage of the pixel signal with positive polarity and a voltage of the pixel signal with negative polarity.

7. A driving method, adapted for a source driver to drive a display panel, wherein the source driver comprises an output buffer having a first input terminal receiving a pixel signal, both of a second input terminal and an output terminal coupled to a display panel, comprising:

pre-charging the output terminal of the output buffer to a preset voltage associated with the pixel signal for a pre-charge period, wherein the output buffer is inactivated during the pre-charge period;

activating the output buffer for a preset period after the pre-charge period;

inactivating the output buffer for a transmission period after the preset period; and delivering the pixel signal to the output terminal of the output buffer during the transmission period.

* * * * *